(12) United States Patent
Rom (10) Patent No.: US 6,360,264 B1
(45) Date of Patent: Mar. 19, 2002

(54) METHOD AND APPARATUS FOR MAINTAINING CONNECTIVITY OF NODES IN A WIRELESS LOCAL AREA NETWORK

(75) Inventor: Raphael Rom, Palo Alto, CA (US)

(73) Assignee: Sun Microsystems, Inc., Mountain View, CA (US)

( * ) Notice: Subject to any disclaimer, the term of this patent is extended or adjusted under 35 U.S.C. 154(b) by 1697 days.

(21) Appl. No.: 08/537,408

(22) Filed: Oct. 2, 1995

Related U.S. Application Data (63) Continuation of application No. 08/316,078, filed on Sep. 30, 1994, now abandoned, which is a continuation of application No. 07/941,735, filed on Sep. 8, 1992, now abandoned.

(51) Int. Cl.[7] ............................................. G06F 15/16
(52) U.S. Cl. ..................................................... 709/227
(58) Field of Search ........................ 340/825.02, 825.2; 370/95.1, 95.3; 379/59, 60; 455/18, 33.1, 33.2, 33.3, 33.4; 395/200.12, 200.06, 200.14, 200.15; 709/227

(56) References Cited

U.S. PATENT DOCUMENTS

| | | | | |
|---|---|---|---|---|
| 4,549,302 A | * | 10/1985 | Heatherington | |
| 4,718,081 A | * | 1/1988 | Brenig | 379/60 |
| 4,765,753 A | * | 8/1988 | Schmidt | 379/60 |
| 4,783,780 A | * | 11/1988 | Alexis | 455/33.3 |
| 4,797,947 A | * | 1/1989 | Labedz | 455/33.3 |
| 4,881,271 A | * | 11/1989 | Yamauchi et al. | 455/33.2 |
| 4,907,290 A | | 3/1990 | Crompton | 455/56 |
| 4,958,341 A | | 9/1990 | Hemmandy et al. | 370/60.1 |
| 5,042,082 A | * | 8/1991 | Dahlin | 379/60 |
| 5,068,916 A | | 11/1991 | Harrison et al. | 455/39 |
| 5,119,397 A | | 6/1992 | Dahlin et al. | 375/5 |

(List continued on next page.)

FOREIGN PATENT DOCUMENTS

| | | | |
|---|---|---|---|
| EP | 0 364 638 | 10/1988 | |
| EP | 0 483 544 | 5/1992 | |
| EP | 0 483 551 | 5/1992 | |
| WO | 9107020 | * 5/1991 | .................. 379/60 |

OTHER PUBLICATIONS

R.E. Kahn et al; "Advances in Packet Radio Technology"; Proceeding of the IEEE; vol. 66, No. 11, Nov. 1978, pp. 1468–1496.*

11th Annual International Phoenix Conference on Computer and Communications Apr. 1, 1992, Scottsdale, US, pp. 255–259, XP310617 K.Arai et al 'A Hybrid Indoor Data Network With Radio And Wire Performance Evaluation In A Rayleigh Channel' *the whole document*.

Primary Examiner—Mark H. Rinehart
(74) Attorney, Agent, or Firm—Blakely Sokoloff Taylor & Zafman (57) ABSTRACT

Methods and apparatus for maintaining connectivity of nodes in a wireless LAN. Accordingly, the present invention provides a method and apparatus for maintaining connectivity in a wireless LAN. The LAN is divided into a plurality of cells. Each cell is occupied by at least one access point for communicating information between the cells, and at least one node for communicating via the LAN through the access points. To initiate a handoff from a first access point with which the node is currently communicating, the node first selects a second access point as a candidate for handoff. The node then communicates an instruction to the first access point instructing the first access point to relay a request to the second access point that the second access point accept a handoff of the node from the first access point. The first access point then relays the request to the second access point. In response, the second access point transmits its operating parameters to the node through the first access point, and the node adjusts its own parameters in response so as to establish communication between the node and the second access point, thereby accomplishing a handoff.

21 Claims, 9 Drawing Sheets

U.S. PATENT DOCUMENTS

| | | |
|---|---|---|
| 5,123,029 A | 6/1992 | Bantz et al. |
| 5,179,559 A * | 1/1993 | Crisler et al. ............... 370/95.1 |
| 5,181,200 A * | 1/1993 | Harrison .................... 455/33.2 |
| 5,199,031 A | 3/1993 | Dahlin .................... 370/110.1 |
| 5,222,249 A * | 6/1993 | Carney ...................... 455/33.2 |
| 5,321,542 A | 6/1994 | Freitas et al. ................ 359/172 |
| 5,323,446 A * | 6/1994 | Kojima et al. ............. 370/95.1 |
| 5,408,514 A * | 4/1995 | Sakamoto et al. ............ 379/59 |

* cited by examiner

Operating Parameters
- Channel Frequency
- Spreading Code
- Data Encryption Code

METHOD AND APPARATUS FOR MAINTAINING CONNECTIVITY OF NODES IN A WIRELESS LOCAL AREA NETWORK

This is a continuation of application Ser. No. 08/316,078 filed Sep. 30, 1994 now abandoned, which is a continuation of application Ser. No. 07/941,735 filed Sep. 8, 1992 now abandoned.

BACKGROUND OF THE INVENTION

1. Field of the Invention

The present invention relates to the field of wireless local area networks (LANs) and, more particularly, to a method and apparatus for maintaining connectivity of nodes in a wireless LAN.

2. Description of the Related Art

Through the merging of computer and communications technology, computer networks have greatly enhanced the computing power available to the individual computer user linked to other computers in a network. Not only do networks provide for the exchange of information between autonomous computers, but they also enable each user or "node" to share resources common to the entire network. Through resource sharing, all application programs, data bases and physical equipment in the network may be made available to any node without regard to the physical location of the resource or the user.

As for the linkage between nodes, there are generally two types of network interconnections. The nodes in a wired network communicate with each other by using transmission lines to carry the signals between the nodes. The nodes in a wireless network, on the other hand, communicate with each other using radio signals or other types of wireless links rather than physical interconnections.

One type of wireless network is a wireless local area network (LAN). A LAN is local in the sense that the transceiver nodes are located within a radius of only a few miles of each other. As such, the proximity of the nodes permits the network to operate reliably at low power and at high data rates.

Typically, nodes in a wireless LAN are mobile and transmit information in packets. These nodes, although mobile, may be geographically grouped at any given time into basic service areas (BSAs), otherwise referred to as "cells." The nodes within a cell communicate with each other either directly or through a cell coordinator that relays messages among the nodes of the cell. The coordinator itself may be implemented either within a regular node or in a node that only performs the coordination function.

Communication between nodes in different BSAs is accomplished through an access point (AP), which is responsible for relaying packets into and out of the BSA. To allow for inter-cell communication, each cell must contain at least one AP. The coordinator and the AP are often implemented in the same node. Communication among the APs may take place over the same or different radio channels or via a separate wired network.

During node power-up, the node is assimilated into the network environment using what is known as the network "self-organization" capability. During self-organization, each node is associated with a coordinator in a cell (if one exists), and in a multi-cell system each node is also associated with at least one AP in a cell. The association of a node with a particular AP may be based on criteria such as the quality of the link between the node and the AP, and the load carried by the AP. The self-organization procedure is considered complete when a node has acquired the parameters that will enable it to effectively communicate within the cell with peer nodes or relay points.

As conditions in the network environment vary, the network must be reconfigured to maintain connectivity between communicating nodes. This reconfiguration or topological change requires the reassociation of a node with another coordinator or another AP or both. The process of ceasing communications between a node and a coordinator or between a node and an access point and reassociating the node with another coordinator or access point is known as "handoff". In a mobile telecommunications system, a handoff is typically required when a node has moved away from one AP towards another, either within a cell or across cells. Network reconfiguration may also arise as a result of a change in the quality of reception between a node and an AP, or because an AP has become overloaded.

In conventional cellular telephone systems, the handoff process is controlled solely by the base stations (corresponding to APs). Because the node does not participate at all (or participates only minimally) in the handoff process, cellular telephone systems require a considerable amount of cooperation among the base stations. This cooperation entails identifying those base stations that are in radio contact with the node as well as determining the most suitable new base stations. However, radio links are asymmetric, and the signal characteristics transmitted are not necessarily the same as those received. Thus, a base station cannot determine how well a node receives a signal transmitted by the base station based upon how well the base station receives a signal from the node. This phenomenon makes the base station selection even more complex.

Once the system is reconfigured, any messages destined for the node must be rerouted to the new base station. In a cellular telephone system, each node can conduct only one conversation at a time with another node in the network. In such a system, a conversation is routed through a series of switches located between the two nodes at the ends of the communication path. When one of those nodes is handed off to another base station, the path must be reconfigured, usually requiring that the message pass through a path consisting of a different set of switches.

Because each telephone in a cellular telephone system carries on only one conversation at a time, it is a relatively simple matter to reconfigure the entire communication path to hand off the telephone conversation. However, unlike a telephone unit in a cellular system, a node in a computer network communicates at high data rates and has the capability to carry on multiple conversations simultaneously with other nodes. The nodes in a computer network typically communicate via packets, wherein each packet may represent a portion of a conversation, and each such packet can be interleaved in any manner with other packets that contain portions of other conversations. Because of the large number of conversations carried on by a node, reconfiguration of all of the communication paths carrying those conversations is understandably a very complex process. Moreover, the fact that computers communicate in this manner renders the technique used by cellular telephone systems inadequate to accomplish the handoff of a computer node because of the inordinate amount of time that would be required to reconfigure the entire communication path to reroute all of these conversations.

SUMMARY OF THE INVENTION

It is therefore an object of the present invention to provide a wireless local area network (LAN) in which the node participates in the coordination of the handoff process.

It is a further object of the invention to provide a wireless LAN in which connectivity is maintained among users carrying on multiple conversations at high data rates.

Accordingly, the present invention provides a method and apparatus for maintaining connectivity in a wireless LAN. The LAN is divided into a plurality of cells. Each cell is occupied by at least one access point for communicating information between the cells, and at least one node for communicating via the LAN through the access points.

To initiate a handoff from a first access point with which the node is currently communicating, the node first selects a second access point as a candidate for handoff. The node then communicates an instruction to the first access point instructing the first access point to relay a request to the second access point that the second access point accept a handoff of the node from the first access point. The first access point then relays the request directly to the second access point. In response, the second access point transmits its operating parameters to the node through the first access point, and the node adjusts its own parameters in response so as to establish communication between the node and the second access point, thereby accomplishing handoff.

BRIEF DESCRIPTION OF THE DRAWINGS

The objects, features and advantages of the present invention will be apparent to one skilled in the art in light of the following detailed description in which.

DETAILED DESCRIPTION OF THE INVENTION

The present invention provides a method and apparatus for maintaining connectivity of nodes in a wireless LAN. Unlike prior art systems, in the present invention the node participates in the decision as to whether it will be handed off and, if so, to which access point. Moreover, the invention applies not only to a node maintaining a single conversation, but it also supports multiplexed communication among nodes operating at high data rates in a packet switching environment.

Figure 1:
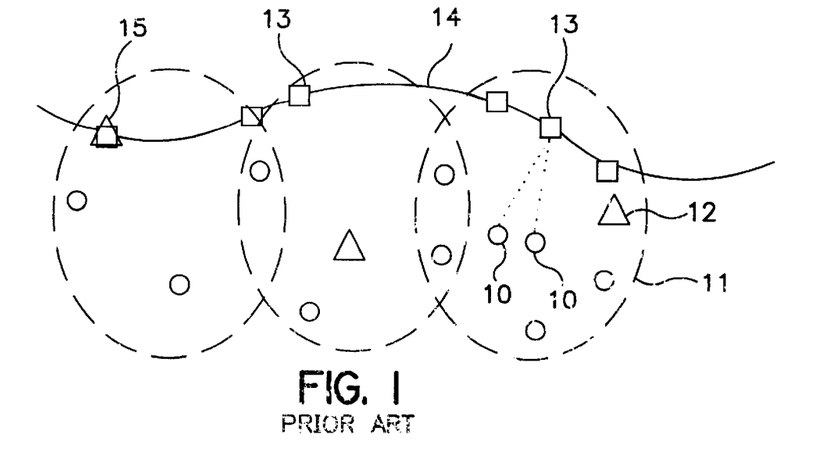
FIG. 1 is an illustration of a wireless LAN.

FIG. 1 illustrates a typical wireless LAN. Nodes 10 are organized into geographic regions called "basic service areas" (BSAs) or "cells" 11. Note that a node can belong to more than one cell. The nodes within a cell communicate with each other either directly or through a coordinator 12, which relays messages among the nodes of the cell.

A node within one cell cannot communicate directly with a node in another cell. Rather, the message must be relayed through a series of access points (APs) 13, which are linked together either through a separate radio channel or a wired network 14.

Each cell contains at most one coordinator and at least one access point, and each node within a cell is associated with at most one coordinator and at least one access point. The functionality of the coordinator and the access point may be combined in a single device 15. In addition, more than one node may be associated with a given AP. For example, two nodes 10 are associated with AP 13, as indicated by the dotted lines.

The determination of which AP is to be associated with a particular node is based upon criteria such as the quality of the signal transmitted between the node and the AP, and the load carried by the AP. This process of associating a node with an AP is known as "self-organization," and is well known in the art. Preferably, the invention utilizes the self-organization process described in copending U.S. patent application Ser. No. 07/915,433, filed Jul. 17, 1992, titled "METHOD AND APPARATUS FOR IMPLEMENTING SELF-ORGANIZATION IN A WIRELESS LOCAL AREA NETWORK."

Figure 2A:
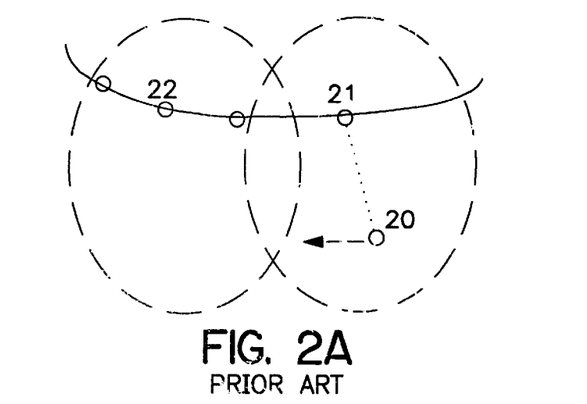
FIGS. 2A and 2B illustrate the handoff of a node in a wireless LAN.
Figure 2B:
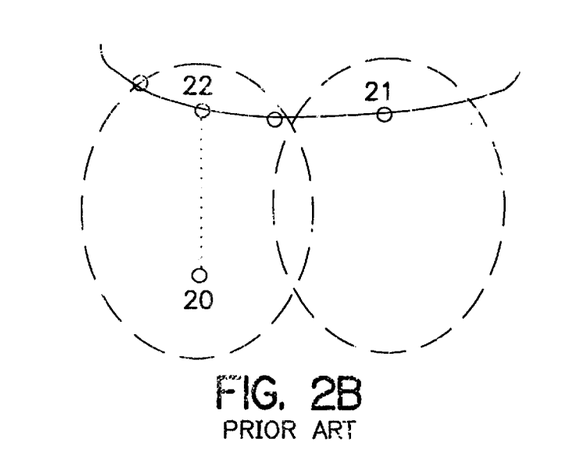

FIGS. 2A and 2B generally illustrate the handoff process in a wireless LAN. FIGS. 2A and 2B show a node 20 traveling from one BSA to another. Initially, node 20 is associated with an access point 21. As node 20 moves away from AP 21 and towards AP 22, the quality of the radio link between AP 21 and node 20 deteriorates. Thus, it is desirable to sever the link between node 20 and AP 21, and reassociate node 20 with an AP that would offer a higher quality of message transmission to node 20.

As node 20 approaches the cell occupied by access point 22, AP 22 becomes a potential candidate for reassociation because it is now closer to node 20, and thus is likely to offer a better communications link to the node. Therefore, node 20 is handed off to AP 22, as shown in FIG. 2B.

Figure 3A:
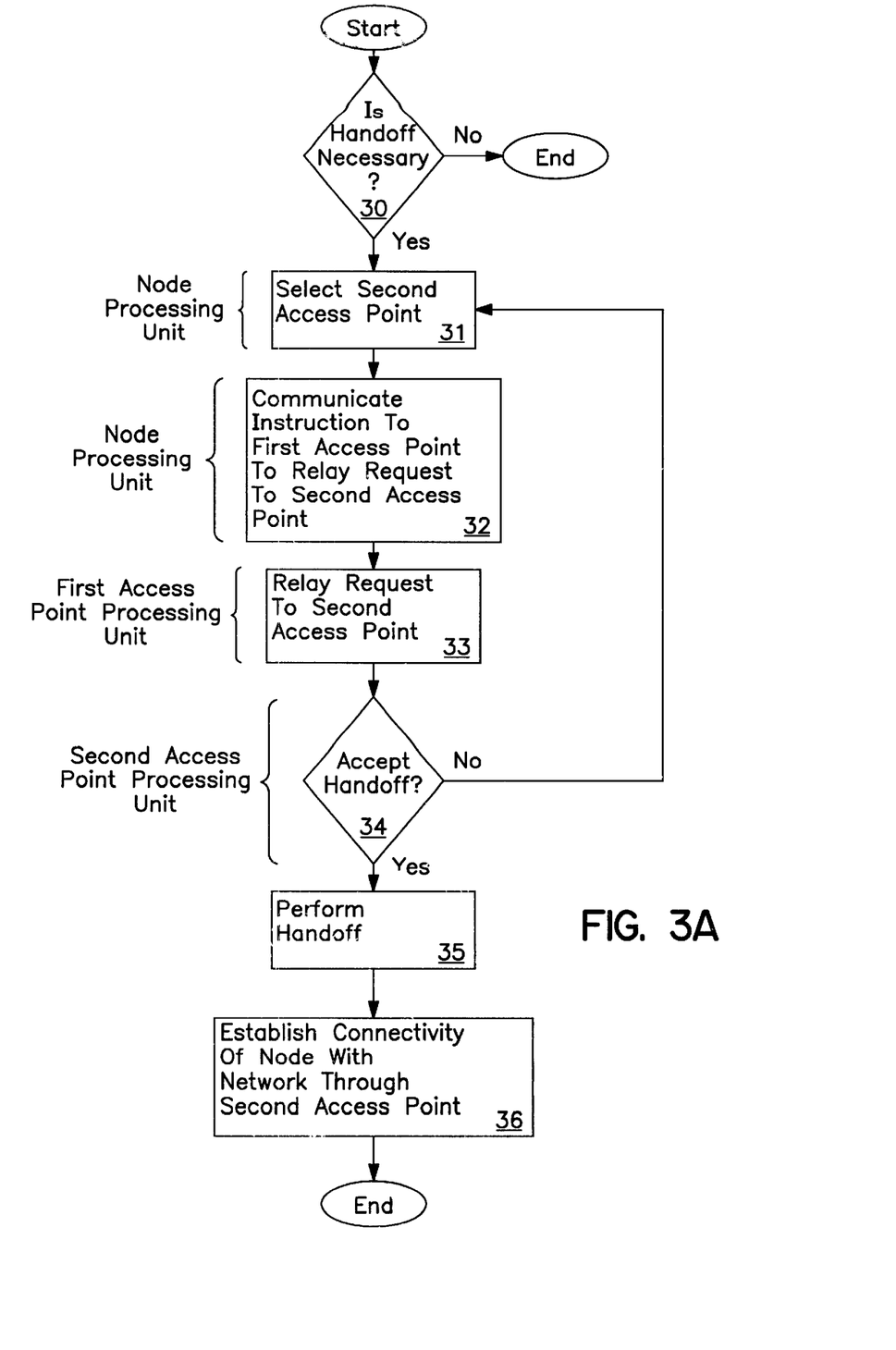
FIG. 3A is a flow chart illustrating the method of the present invention.
Figure 3B:
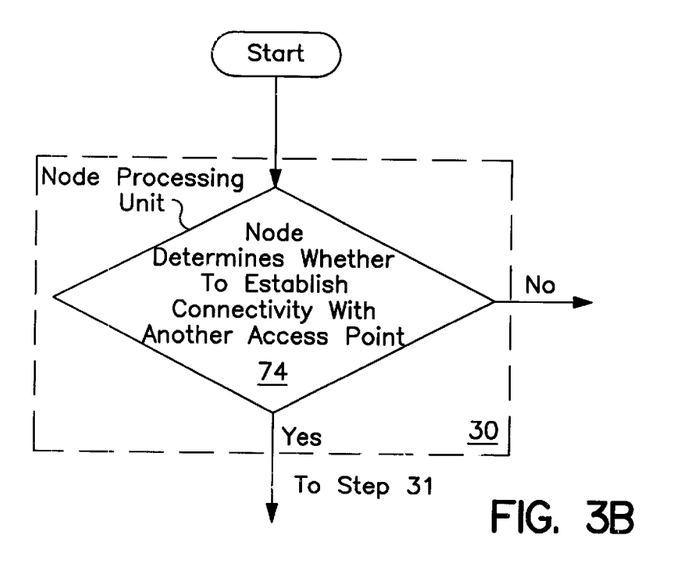
FIGS. 3B–3F are more detailed illustrations of the steps of FIG. 3A.
Figure 3C:
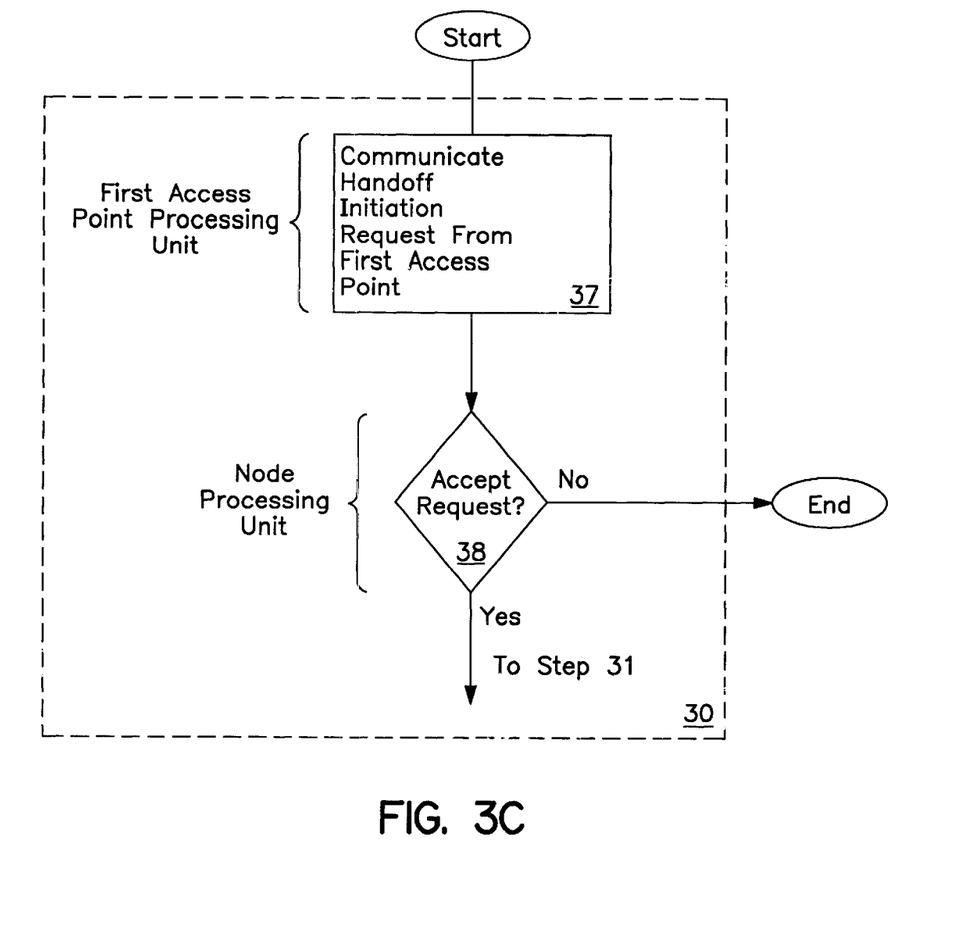

FIG. 3A is a flow chart illustrating the method of the present invention. In this and other flowcharts herein, the flowchart steps are annotated with the names of the components (shown in FIG. 6) that perform the diagrammed steps. To initiate the process, the node first determines whether handoff is necessary, as shown in step 30 and further illustrated as step 74 in FIG. 3B. For example, the node may measure the quality of the signal received from the access point with which it is communicating, and determine that handoff is necessary when received signal quality drops below a predetermined threshold. In one embodiment, the determination by the node of whether a handoff is necessary may be made in response to a request from the access point with which the node is currently communicating, as shown in FIG. 3C. The current access point communicates a request to the node that it initiate the reassociation process in order to be handed off to another access point, step 37. The node has the option of accepting or rejecting this request, step 38. In another variation, the determination of whether handoff is necessary may be made solely by the current access point. These latter two approaches are useful in the case that the current access point is associated with so many nodes that the traffic of messages communicated through the access point is exceeding its maximum predetermined load, even though the radio link between the node and the access point may be adequate.

When handoff is deemed necessary, the node acquires parameters from other access points. These parameters may include, for example, information concerning administrative domain and access point load. (The administrative domain represents the particular authority which operates a given access point.) Based upon this information and the quality of the signals received from the other access points, the node determines an AP to select for reassociation, step 31.

The selection of the new access point by the node represents a significant advantage over prior art systems in which the node does not actively participate in the reassociation process. In conventional systems, the access points must determine, through communications among themselves, which AP will be associated with the node for handoff, using such criteria as which AP receives the highest quality signal from the node. However, due to the asymmetric nature of radio links, the node itself can best determine the quality of the signal received at the node. Thus, by accounting for the signal reception at the node, the present invention achieves a substantial improvement in the quality of the node-access point association.

After selecting a new access point, the node communicates an instruction to the current access point instructing it to relay a message to the selected access point, requesting that the selected access point accept the handoff of the node, step 32. This request is relayed to the selected access point by the current access point, along with a transfer of certain node parameters representing characteristics of the node, step 33. These node parameters may include, for example, an identification of the user occupying the node.

Figure 3D:
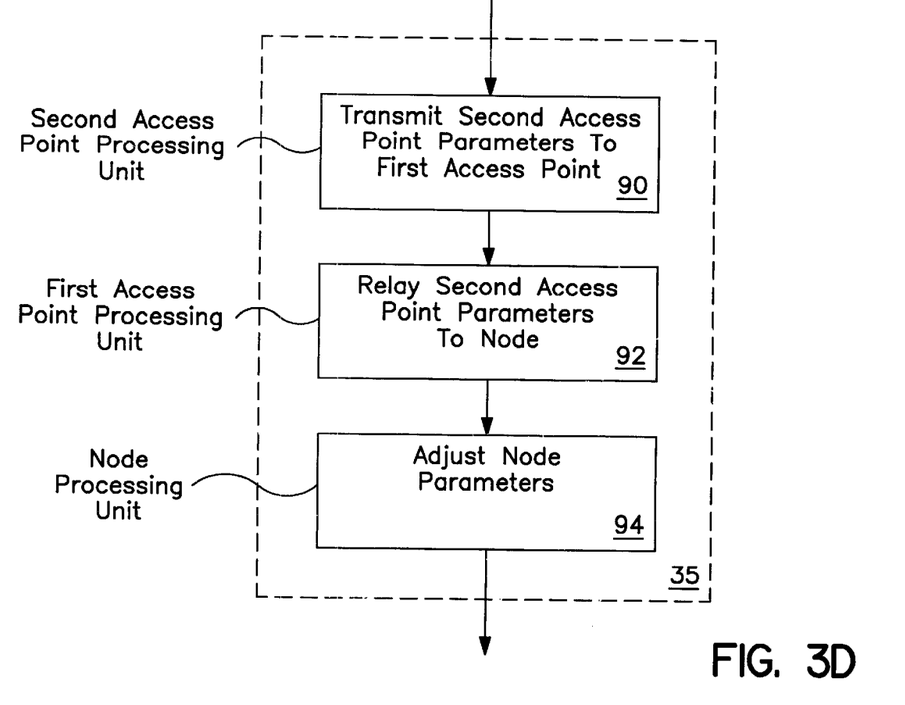
Figure 7:
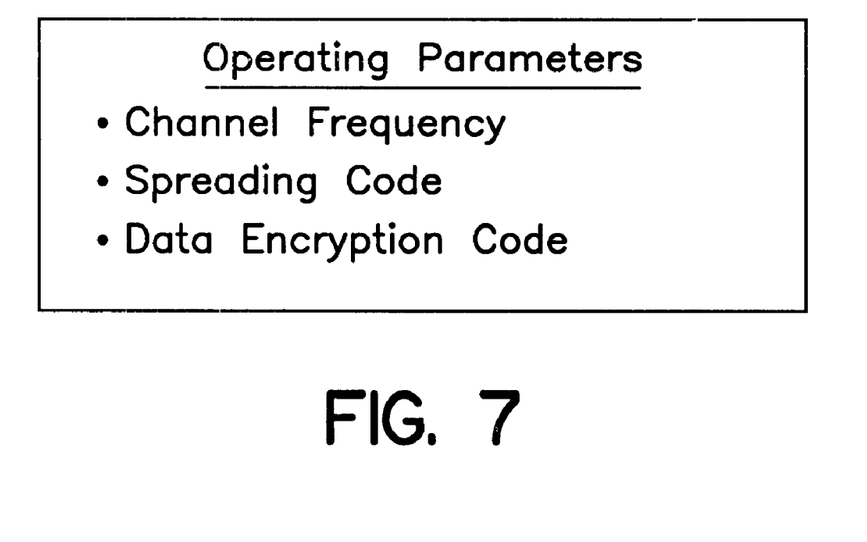
FIG. 7 illustrates a packet containing access point operating parameters.
Figure 8:
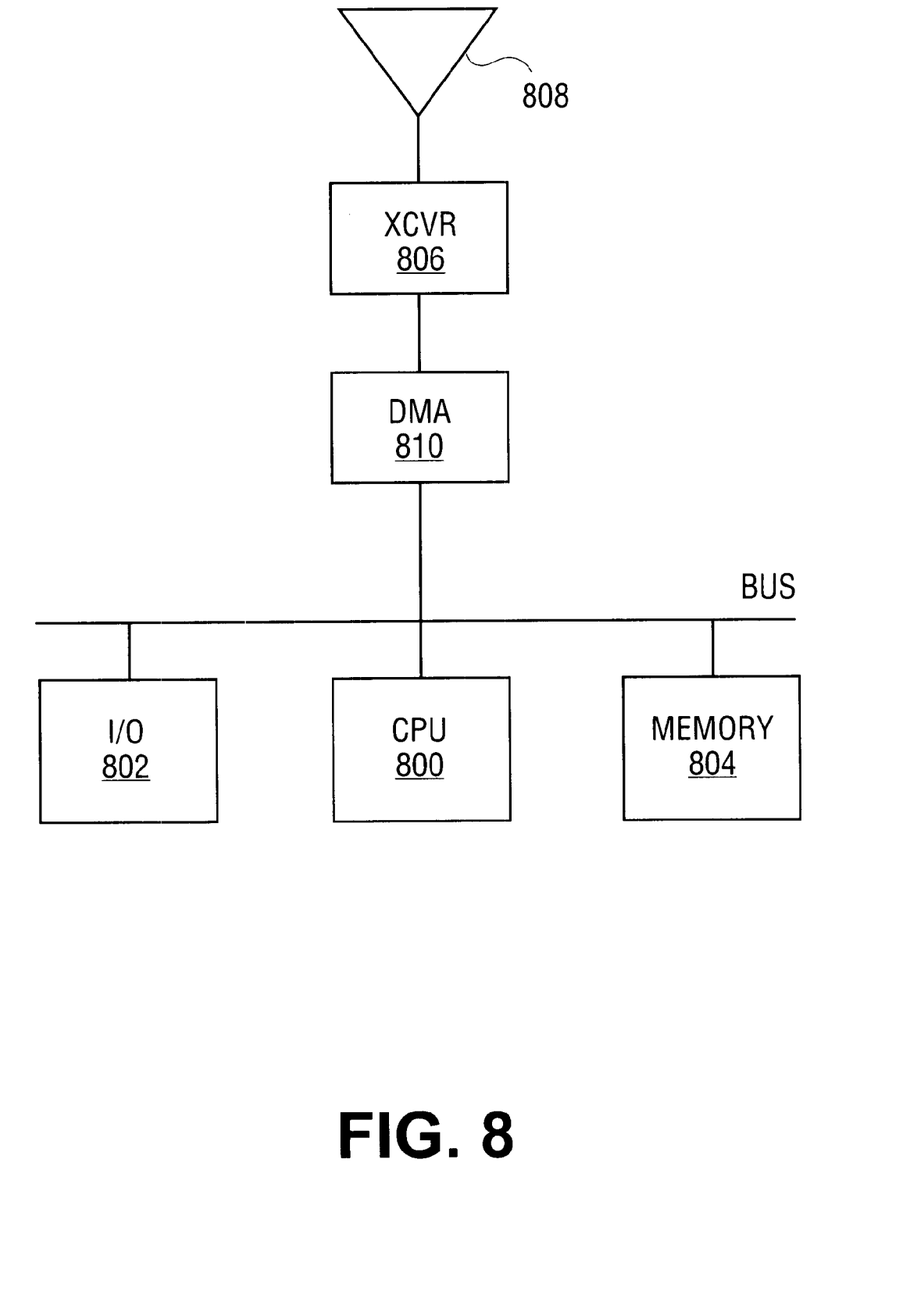
FIG. 8 illustrates a microprocessor-based transceiver that can be used to implement the nodes and access points of the present invention.

Under one approach, the selected access point responds automatically to the node's request by transferring a packet containing its operating parameters to the node through the old access point. The operating parameters typically include, but are not limited to, the frequency of the channel on which the selected access point communicates with nodes, spreading codes (in spread spectrum systems) and data encryption information required to access the selected access point. A typical packet is illustrated in FIG. 7. Based upon these access point parameters, the node adjusts its own parameters and commences communication with the new access point, thereby accomplishing handoff, step 35. The process is further illustrated in steps 90, 92 and 94 of FIG. 3D.

Alternatively, the selected access point does not automatically transfer its operating parameters in response to the request of the node. Rather, the selected access point determines whether to accept the handoff based upon predetermined criteria, including the node parameters, step 34. For example, the selected access point may examine whether its load is light enough to accommodate communication with another node, whether the quality of the signal received from the node is satisfactory, and whether the identification of the node reveals that it is authorized to communicate with the selected access point. If the selected access point accepts the handoff, then it transmits its operating parameters to the node through the old AP, so that handoff may be accomplished, step 35.

If, at step 34, the selected access point rejects the request of the node, then the node repeats the reassociation process, steps 31, 32, 33, 34, to select a different access point with which to establish communications.

Figure 4:
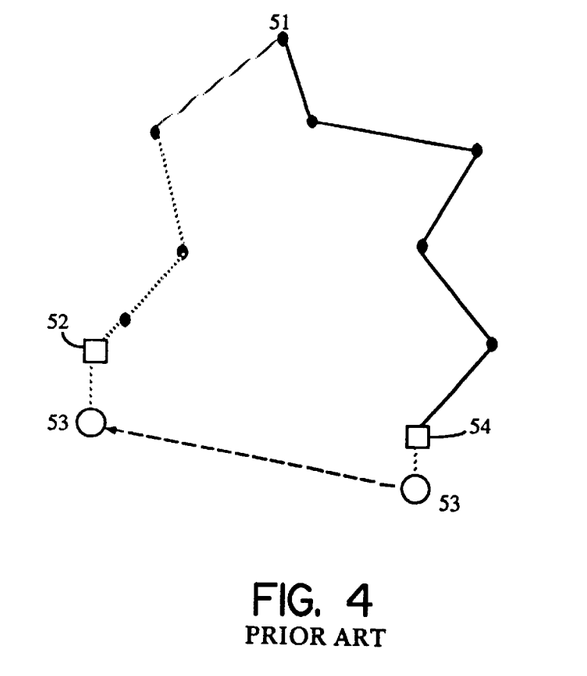
FIG. 4 illustrates the reconfiguration of a prior art cellular network telephone after handoff.

After handoff has been accomplished, messages intended for the node must be rerouted to the new access point in order to maintain connectivity of the node with the rest of the network. As shown in FIG. 4, in a conventional cellular telephone system, the system may be reconfigured at every point in the communication path in order to reroute a message from its source node 51 to the access point 52 that has accepted handoff of the node 53 from the previous access point 54. As discussed above, this conventional method is too slow to accommodate the handoff of a node that may be engaged in multiple conversations with other nodes.

Figure 3E:
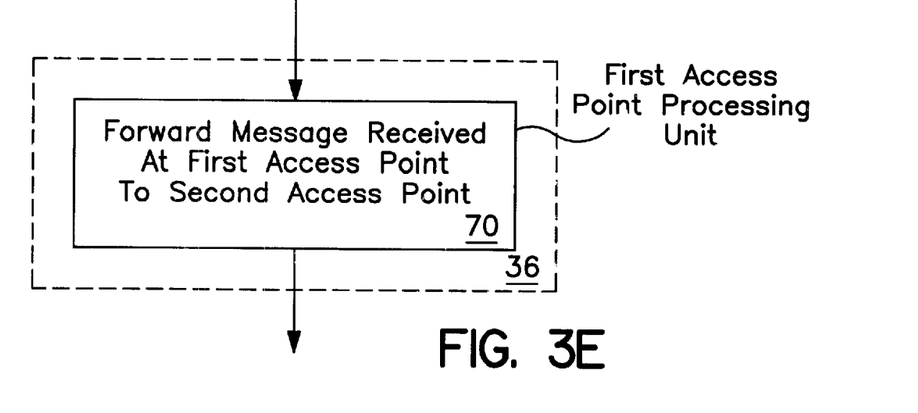
Figure 5:
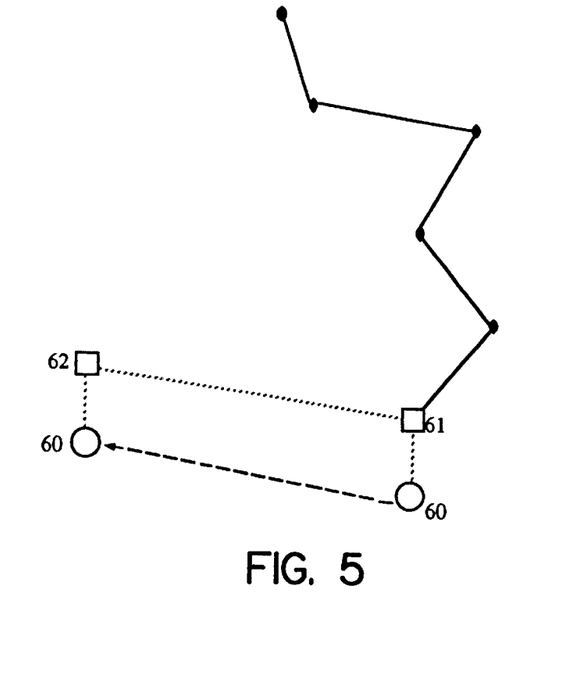
FIG. 5 illustrates the reconfiguration of a wireless LAN after handoff according to the present invention.

In contrast, the present invention avoids this degree of complexity. This is illustrated by FIG. 5. Instead of reconfiguring in advance every point throughout the path, the communication path remains intact except that the message is now forwarded from the old access point 61 to the new access point 62. For example, when a message intended for the node 60 is received at access point 61, AP 61 forwards the message to the new access point 62. In this manner, the invention establishes connectivity of the node with network through the second access point, step 36 further illustrated as step 70 in FIG. 3E).

Figure 3F:
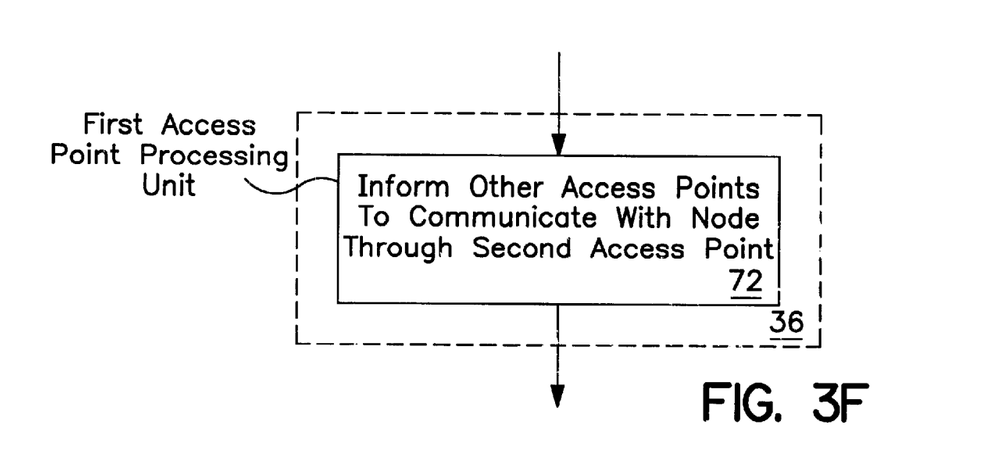

In addition, the old access point 61 may inform other nodes and access points that node 60 is now associated with new access point 62, thus allowing the other access points to adjust their parameters and communicate directly with access point 62 (step 36, further illustrated as step 72 in FIG. 3F). This process of informing other nodes and access points may be performed at a time convenient to do so, i.e., when there is a break in communications and need not be done immediately.

By avoiding reconfiguration of the network at every point in the communication path, the present invention achieves a significant advantage over conventional systems. As discussed above, the conventional method is too slow to accommodate the handoff of a node that may be engaged in multiple conversations with other nodes. However, the manner in which the present invention establishes connectivity between the node through the new access point and the rest of the network is much simpler and faster than the full scale reconfiguration required by conventional means.

Figure 6:
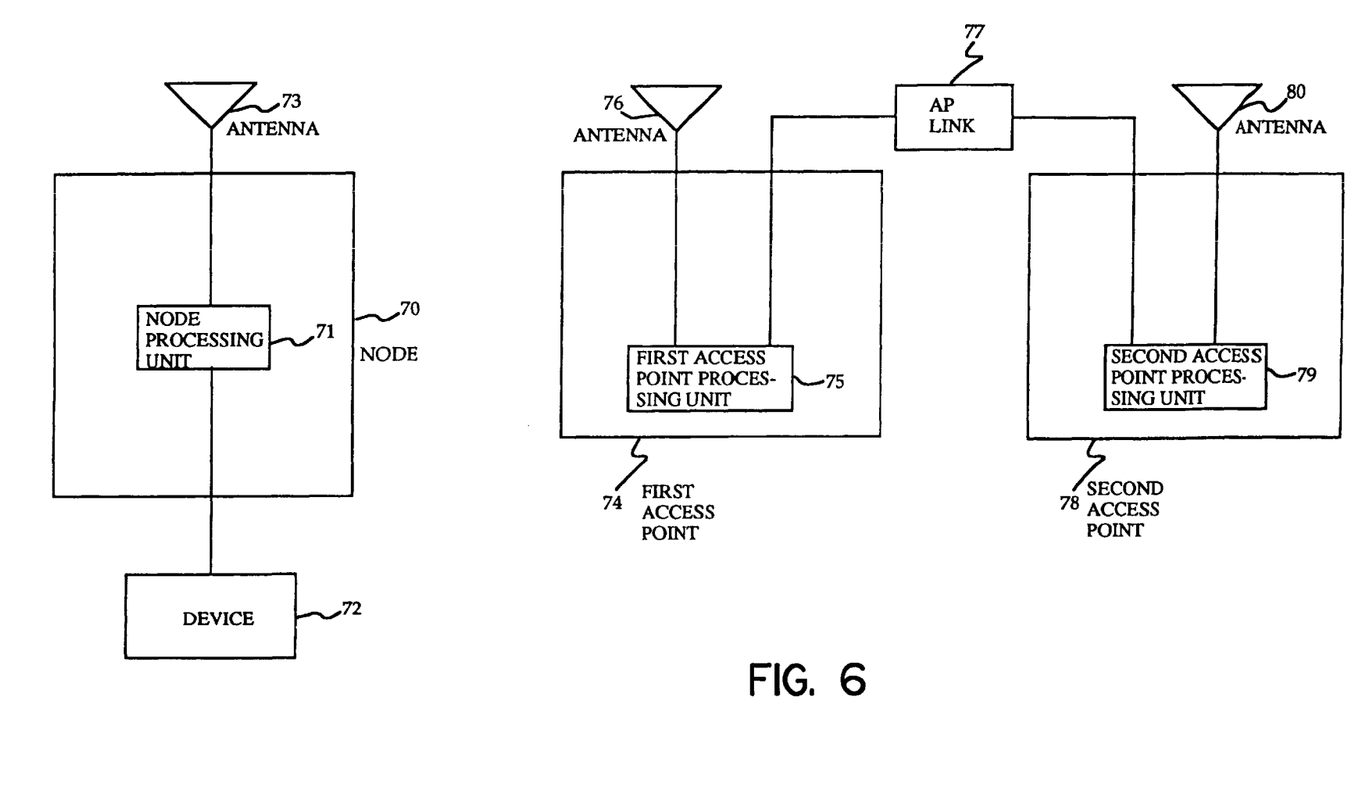
FIG. 6 illustrates an apparatus implementing the present invention.

FIG. 6 is a simplified block diagram of a node 70 and two access points 74 and 78, which may be used to implement the present invention.

Each node 70 includes a node processing unit 71 which communicates with a device 72 and is connected to an antenna 73 to permit communication between the node and the network. The device 72 represents any apparatus that occupies a node, e.g., a computer, a peripheral device or communications hardware.

Access point 74 includes an AP processing unit 75, which is linked to antenna 76 to allow AP 74 to communicate with node 70 and other nodes in the network.

All communications among access points are handled through AP link 77, which may be implemented as a radio transceiver or as an interface to a separate wired network of access points.

Through AP link 77, access point 74 is connected to other access points, such as access point 78. Access point 78, like access point 74, includes an AP processing unit 79 connected to AP link 77 and an antenna 80.

The node processing unit 71, through antenna 73, communicates via radio with first access point processing unit 75 through antenna 76. The node processing unit 71 may decide that the node 70 should establish communications with another access point if, for example, the quality of signal received by the node processing 71 from the first access point 74 falls below a predetermined signal quality threshold, or if the traffic load being carried by the first access point processing unit 75 exceeds a predetermined load threshold. When handoff is deemed necessary, the node processing unit 71 acquires parameters from other access points. For example, second access point processing unit 79, through antenna 80, may transmit information regarding administrative domain and access point load. Based upon this information and the quality of the signals received from the other access points, the node processing unit 71 selects an AP, such as second access point 78, for reassociation.

After selecting an AP, the node processing unit 71 communicates an instruction to first access point processing unit 75 to relay a request over AP link 77 to second access point processing unit 79, requesting that second access point 78 accept a handoff of the node 70. The request is relayed to second access point processing unit 79 along with a transfer of certain node parameters representing characteristics of the node 70.

Based upon a number of factors, including the node parameters, the AP processing unit 79 determines whether to accept the handoff. If so, then through AP link 77, second access point processing unit 79 transmits operating parameters across AP link 77 to first access point processing unit 75 to be relayed to the node 70. The node processing unit 71 adjusts the operating parameters of the node so that it can communicate across a radio link through antennas 73 and 80 to the second access point processing unit 79, thereby accomplishing handoff.

To maintain connectivity of the node 70 with the rest of the network after handoff, the first access point processing unit 75 forwards messages intended for node 70 across AP link 77 to the second access point processing unit 79 upon receipt of those messages at the first access point 74. In addition, the first access point processing unit 75 may inform other access points over AP link 77 that node 70 is now associated with second access point 78, thus allowing the other access points to communicate directly with access point 78.

Although the invention has been described in conjunction with the preferred embodiment, it will be appreciated that various modifications and alterations might be made by those skilled in the art without departing from the spirit and scope of the invention.

What is claimed is:

1. In a wireless local area network (LAN) comprising a plurality of cells, each cell including at least one access point for communicating information between cells and at least one node for communicating via the LAN through said access points, a method for maintaining connectivity of a node in the wireless LAN comprising the steps of:
   (a) the node selecting a second access point as a candidate for accepting a handoff of the node from a first access point;
   (b) communicating an instruction from the node to the first access point instructing the first access point to relay a request to the second access point that the second access point accept a handoff of the node from the first access point to the second access point;
   (c) directly relaying said request from the first access point to the second access point; and
   (d) performing the handoff, such that the node communicates with the second access point.

2. The method as set forth in claim 1, further comprising the step of determining whether said second access point will accept the request for a handoff.

3. The method as set forth in claim 2, further comprising the step of repeating said selecting, communicating, relaying and determining steps if said second access point determines not to accept said request for a handoff.

4. The method as set forth in claim 1, wherein the step of performing a handoff comprises the steps of:
   (a) transmitting second access point operating parameters from second access point to said first access point;
   (b) relaying said second access point operating parameters to said node from said first access point; and
   (c) adjusting node parameters in response to said second access point parameters so as to establish communication between said node and said second access point.

5. The method as set forth in claim 4, wherein one of said second access point operating parameters comprises a spreading code utilized by said second access point.

6. The method as set forth in claim 1, further comprising the step of, after said handoff has been performed, forwarding a message that is destined for said node from said first access point to said second access point upon receipt of said message at said first access point, wherein the second access point communicates the message to the node.

7. The method as set forth in claim 1, further comprising the step of, after said handoff has been performed, informing other access points that said node has been handed off to said second access point, such that communications to said node are achieved through said second access point.

8. The method as set forth in claim 1, before said selection step, further comprising the step of the node determining whether to establish connectivity with another access point.

9. The method as set forth in claim 8, further comprising the steps of:
   communicating a handoff initiation message from said first access point to said node requesting that said node establish connectivity with another access point; and
   said node determining whether to establish connectivity with another access point in response to the request of the first access point.

10. The method as set forth in claim 1, before said selection step, further comprising the step of the first access point determining whether the node should establish connectivity with another access point.

11. In a wireless local area network (LAN) comprising a plurality of cells, each cell including at least one access point for communicating information between cells and at least one node for communicating via the LAN through said access points, a method for maintaining connectivity of a node in the wireless LAN comprising the steps of:
   said node determining whether to establish connectivity with another access point; and
   if said node determines to establish connectivity with another access point:
      said node selecting a second access point as a candidate for accepting a handoff of said node from a first access point;
      communicating an instruction from said node to said first access point instructing said first access point to relay a request to said second access point that said second access point accept a handoff of said node from said first access point to said second access point;
      relaying said request directly from said first access point to said second access point;
      determining whether said second access point will accept said handoff;
   if said second access point determines to accept said handoff:
      transmitting second access point operating parameters from said second access point to said first access point, wherein one of said operating parameters comprises a spreading code utilized by said second access point;
      relaying said second access point operating parameters to said node from said first access point;

adjusting node parameters in response to said second access point operating parameters so as to establish communication between said node and said second access point, thereby accomplishing a handoff; and if said second access point determines not to accept said handoff, repeating said selecting, communicating, relaying and determining steps.

12. In a wireless local area network (LAN) comprising a plurality of cells, an apparatus for maintaining connectivity in the LAN comprising:

a plurality of access points for communicating information between cells;

link means connected to first and second access points for permitting communications between said first and second access points; and at least one node for communicating over the LAN through said access points;

each node comprising:

node programming logic for selecting a second access point as a candidate for handoff of said node from a first access point, forming an instruction instructing said first access point to relay a request to said second access point requesting that said second access point accept a handoff of said node from said first access point, and causing said instruction to be communicated to said first access point, and handing off said node to said second access point by establishing communications between said node and said second access point, said first access point comprising first access point programming logic for relaying said request directly from said first access point to said second access point over said link means.

13. The apparatus as set forth in claim 12, wherein said second access point comprises second access point programming logic for determining whether said second access point will accept said handoff.

14. The apparatus as set forth in claim 13, wherein, if said second access point programming logic determines to reject said handoff, said node programming logic selects an alternate access point and communicates an instruction to the first access point instructing the first access point to relay a request to the alternate access point requesting that the alternate access point accept a handoff of the node.

15. The apparatus as set forth in claim 12, wherein:

said second access point comprises circuitry for relaying second access point operating parameters to said node through said link means and said first access point; and said node programming logic comprises circuitry for adjusting node parameters in response to said second access point operating parameters so as to establish communications between said node and said second access point.

16. The apparatus as set forth in claim 15, wherein one of said second access point operating parameters comprises a spreading code utilized by said second access point.

17. The apparatus as set forth in claim 12, said first access point further comprising programming logic for forwarding a message that is destined for said node from said first access point to said second access point upon receipt of said message at said first access point.

18. The apparatus as set forth in claim 12, said first access point further comprising programming logic for informing other access points that said node has been handed off to said second access point, such that communications to said node are achieved directly through said second access point.

19. The apparatus as set forth in claim 12, wherein said node further comprises programming logic for determining whether said node will establish connectivity with another access point.

20. The apparatus as set forth in claim 19, wherein said first access point further comprises programming logic for communicating a handoff initiation message from said first access point to said node requesting that said node establish connectivity with another access point, and said programming logic for determining whether said node will establish connectivity further comprises programming logic for determining whether said node will establish connectivity with another access point in response to the request of the first access point.

21. The apparatus of claim 19, wherein said first access point further comprises programming logic for determining whether the node should establish connectivity with another access point.

* * * * *